United States Patent
Cain et al.

(10) Patent No.: US 6,406,737 B1
(45) Date of Patent: *Jun. 18, 2002

(54) EDIBLE FAT BASED FLAKES

(75) Inventors: Frederick William Cain, Wormerveer (NL); Gerald Patrick McNeill, Channahon, IL (US); Andreas Menzel, Wormerveer (NL)

(73) Assignee: Unilever Patent Holding B.V., Vlaardingen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 09/627,317

(22) Filed: Jul. 27, 2000

(51) Int. Cl.$^7$ .................................................. A23D 9/00
(52) U.S. Cl. ........................ 426/601; 426/417; 426/606; 554/174; 554/175; 554/227
(58) Field of Search ................................. 426/555, 607, 426/560, 640, 606, 417; 554/174, 175, 227

(56) References Cited

U.S. PATENT DOCUMENTS

| | | | | |
|---|---|---|---|---|
| 4,045,588 A | * | 8/1977 | Wieske | 426/607 |
| 5,356,643 A | | 10/1994 | Miller et al. | 426/582 |
| 5,681,608 A | * | 10/1997 | Cain | 426/606 |
| 5,690,985 A | * | 11/1997 | Van Meeteren | 426/607 |
| 5,756,143 A | * | 5/1998 | Cain | 426/606 |
| 5,908,654 A | * | 6/1999 | Cain | 426/607 |
| 5,968,584 A | * | 10/1999 | Cain | 426/601 |
| 6,004,615 A | | 12/1999 | Kim et al. | 426/650 |
| 6,020,020 A | * | 2/2000 | Cain | 426/601 |
| 6,159,523 A | * | 12/2000 | Cain | 426/601 |
| 6,165,518 A | * | 12/2000 | Cain | 426/588 |
| 6,312,752 B1 | * | 1/2001 | Lansbergen | 426/607 |
| 6,190,722 B1 | | 2/2001 | Kim et al. | 426/650 |

FOREIGN PATENT DOCUMENTS

| | | |
|---|---|---|
| EP | 1101409 | 5/2001 |
| EP | 1101410 | 5/2001 |
| GB | 2176143 A * | 12/1986 |

* cited by examiner

*Primary Examiner*—Carolyn Paden
(74) *Attorney, Agent, or Firm*—Morgan, Lewis & Bockius LLP

(57) ABSTRACT

Edible fat based flakes containing a flavoring system and displaying an excellent oral and textural properties are disclosed that contain i) 0 to 2% moisture
ii) 25 to 90 wt % of a fat containing:
   a vegetable fat with an N20 of more than 50 and
   5 to 40 wt % of a fish oil composition, containing w-3 fatty acids so that the w-3 content of the total flavored fat system ranges from 0.1 to 20 wt %
iii) 0 to 15% of a flavoring system
iv) 0 to 40% of sugar
v) 0 to 60 wt % of a filler
vi) 0 to 50% of a health component and which flakes have a size of 0.05 mm to 2.5 cm.

14 Claims, No Drawings

EDIBLE FAT BASED FLAKES

BACKGROUND OF THE INVENTION

Edible fat based, flavoured fat systems suitable for use in baked goods and snacks are known from U.S. Pat. No. 5,431,945 or U.S. Pat. No. 4,356,643 or U.S. Pat. No. 5,447,735. From these documents butter based flakes are disclosed in U.S. '945. These flakes are free of sugar and contain a lot of predried butter fat and high contents of dried milk solids. Particulars of the fats that can be applied are not given, all that is said about the nature of the fats, that can be applied is that they are related to butter fat. According to U.S. '643 cheese based flakes can be obtained along lines that are very similar to the lines set out above for U.S. '945. These flakes contain high levels of dried cheese solids while the fats that can be applied are the same or very similar to the fats according to above U.S. '945. According to U.S. '735 cinnamon based flakes can be obtained that contain large amounts of granulated sugar while the fat is again a butter fat or a fat closely related to butter fat. Therefore fat flakes that contain high amounts of the healthy polyunsaturated fatty acids such as DHA or EPA are not disclosed in the prior art. It would be very beneficial if such products could be made, because this will mean that the flakes can be used to administer these very healthy fatty acids to the consumer via the flakes, when applied in bakery products. However a problem was anticipated before hand because it was found by the inventors that blends of vegetable fat and fish oil are not storage stable and develop an off taste and/or fishy smell when stored at room temperature within 2 weeks. As for the fat flakes a period between production and end use of 4 or more weeks will not be unusual the fat flakes should be stable for at least such a period when stored at room temperature. Therefore it was expected that fish oils could not be used in the fat flakes. Unexpectedly we found that fish oils could be applied successfully in the flakes under the condition of the invention resulting in products that were storage stable for at least 4 weeks and even for more than 3 months.

SUMMARY OF THE INVENTION

Our invention therefore concerns in the first instant the finding of fats that overcome the problems of the prior art. In particular we found novel edible fat based, flavoured fat systems suitable for use in baked goods and snacks comprising:
  i) 0 to 2 wt % of moisture;
  ii) 25 to 90 wt %, preferably 30 to 70 wt % of a bakery compatible fat composition, comprising:
    (1) a vegetable fat or a derivative therefrom having an N20 (unstabilised by NMR-pulse)of more than 50, preferably more than 65 and
    (2) 5–40 wt %, preferably 15 to 35 wt % of a fish oil composition, containing w-3 fatty acids in such quantities that the total w-3 content of total flavoured fat system ranges from 0.1 to 20 wt %, preferably 2 to 10 wt % (i.e. on total flake)
  iii) 0 to 15 wt % of a flavouring system
  iv) 0 to 40 wt % of sugar
  v) 0 to 60 wt %, preferably 5 to 40 wt % of a filler material other than sugar
  vi) 0 to 50 wt %, preferably 5 to 40 wt % of a health component, and which edible fat based system has a particle size between 0.05 mm and 2.5 cm.

DESCRIPTION OF THE PREFERRED EMBODIMENTS

The flakes so obtained displayed excellent properties like hardness and oral mouthfeel. It was unexpected that the use of fish oil having a relatively low N25 values still have such a good hardness because it should have been expected that these fats would result in low hardness values and thus in insufficient textural properties.

As fish oil any known commercial fish oil, such as Menhaden fish oil could be applied. However we prefer to use the fish concentrates as disclosed in our WO 97/19601. These fish oils contain high levels of polyunsaturated fatty acids, in particular high levels of DHA and EPA while the ratio of DHA and EPA is relatively low i.e. from 0.5 to 6.0 meaning that these fats can be relatively rich in either EPA or DHA. Thus we have a preference for edible fat based fat system according to the invention wherein the w-3 fatty acids are mainly, preferably for more than 40%, EPA and DHA, and are preferably present in a ratio DHA/EPA of 0.5–6.0.

The other fat component of the fat blend, i.e. the fat with an N20 of more than 50 can be selected from any natural fat or fraction therefrom, optionally after hardening meeting this N20 value. Examples of such fats are: cocoa butter; cocoa butter equivalents such as palm mid fractions, shea stearin and illipe; palm stearin; hardened liquid oils, such as hardened sunflower oil, hardened rape seed oil, hardened bean oil.

Flavouring systems that can be applied in our novel flakes can be selected from the group consisting of the natural flavour components from fruit, like lemon, oranges, strawberries, raspberries, blueberries, goose berries, redberries, blackberries, apples, pears, peaches, apricots, cherries, from nuts, like walnuts, hazelnuts, macadamia's, groundnuts, from herbs or spices like cinnamon, ginger, nutmeg, cloves, allspice, ethnic flavours (Mediterranean, Cajun), from maple sugar or dehydrated maple syrup, from garlic or onions, from butter or cheese, from savory flavours such as savory culinary aids, from synthetic flavour components imitating above natural flavours, and from mixtures thereof. These flavouring systems can be applied in any form, including forms that are excluded by U.S. '735, wherein the flavour must be a particulated solid. The flavours that can be applied can be used in a form selected from the group consisting of: finely devided solid flavours; finely divided solid or liquid flavours on a solid carrier, liquid flavours and microcapsules containing a solid, or liquid, or gaseous flavour.

The fats that lead to the beneficial results indicated above are different from or dissimilar to butter fat and can be selected from the group consisting of: natural or hardened glycerides based on C12+ fatty acids such as cocoa butter, soybean oil, cotton seed oil, groundnut oil, rapeseed oil, sunflower oil, corn oil, palm oil, shea oil, illipe fat, palm kernel oil, coconut oil or fractions or blends thereof and preferably having a content of less than 5 wt % trans acids The filler is used to structure the flakes while not attributing to much to its caloric content. Suitable filler materials are dried particulated ingredients preferably selected from the group consisting of flour, skim milk powders, butter milk powder, starches, polysaccharides other than sugar, gums, whey powder, cellulose and hydrocolloids.

As the consumers are nowadays more and more interested in products that are healthy and in particular in foods that contain health components, the most preferred fats that can be applied are essentially free of trans fatty acids, in particular these fats contain less than 5 wt % of these trans acids.

This thus means that in particular partially hardened fats i.e. fats with a relatively high trans fatty acid content, which are known to give structuring to food products but that are considered as less healthy fats, are less preferred in these foods. It was unexpected that such health foods could still be obtained without the need to use such partially hardened fats.

Because of the fats that we apply in our novel flakes it is possible now to make healthy food products that contain a healthy fat component. Simultaneously we also can incorporate a health component in the flakes in an amount that is effective to benefit from its presence in the flakes. The health component remains homogeneously distributed in the flakes and can be selected from olives, grapes, grape fruit, pumpkins, paprika, garlic, tomatoes, oranges, lemons, berries, nuts, in particular in the form of particulated fruit skins of olives, grapes, grape fruit, tomatoes, paprika, or particulated garlic, onions, herbs or spices.

In addition to these components also other health components can be present such as vitamins and minerals. Herefore all well known vitamins and minerals can be applied. Some of these components are present in milk or cheese components or in other natural products that could be added as well.

According to another embodiment of our invention our novel flakes can be prepared by a process wherein 1. the fat applied is molten to about 45 to 60° C.
2. the dry ingredients are incorporated in the molten fat until a homogeneous mixture is obtained
3. this mixture is transferred to a holding tank where it is agitated continuously for some minutes to some hours at a temperature of about 25 to 45° C.
4. the mixture is then cooled in a tempering unit to 15 to 25° C.
5. the cooled mixture is deposited in a thin layer onto a moving belt
6. the moving belt is passed through a cooling tunnel and the layer of fat is cooled to a temperature of about 0 to 15° C. using a residence time of about 2 to 15 minutes
7. the cooled (solid) mixture is broken into discrete particles with the required particle size
8. the broken particles can then be packed According to a last embodiment our invention also concerns the bakery or snack products containing the edible fat based system according to the invention.

EXAMPLES

The following procedure was applied for all formulations: The dry ingredients were dispersed into the molten fat at 45 to 50° C. and a homogeneous mixture was made. In formulations 1 and 2 the liquid flavour was added at this point and the mixture was stirred again for 5 minutes. This mixture was pumped into an agitated holding tank and was held at 40° C. for 20 to 30 minutes. The mixture was deposited on to a moving belt as a thin layer and the belt was passed through a cooling tunnel at a temperature of 5° C. for 10 minutes. The mixture on the belt solidified and was broken into dry flakes of about 0.5 to 1 cm. The flakes were packed into containers.

| Formulation 1: Natural Basil Flavor (fresh) | |
| --- | --- |
| | Wt % |
| Flour | 31.5 |
| Fat Blend | 67.5 |
| Flavor(1) | 1.0 |

(1)T. Hasegawa Natural Basil Flavor Liquid WONF FCO620 Fat Blend Used: Fat A/Fat B/Menhaden 10:70:20 W-3 content of the flakes: 3.8%

| Formulation 2: Cajun Flavor (spicy) | |
| --- | --- |
| | Wt % |
| Flour | 30.25 |
| Fat Blend | 68.00 |
| Flavor(2) | 1.75 |

(2)T Hasegawa Natural Cajun Spicy Liquid FX1710 Fat Blend Used: Fat A/Fat B/Menhaden 10:70:20 W-3 content of the flakes: 3.8%

| Formulation 3: Mediterranean Flavor | |
| --- | --- |
| | Wt % |
| Flour | 30.0 |
| Fat Blend | 68.0 |
| Flavor(3) | 2.0 |

(3)Flavors of North America # 936.563/PM Powder Fat Blend Used: Fat A/Fat B/Menhaden 10:70:20 W-3 content of the flakes: 3.8%

| Formulation 4: Seafood | |
| --- | --- |
| | Wt % |
| Flour | 30.0 |
| Blend | 68.0 |
| Flavor(4) | 2.0 |

(4)FIS Seafood Flavor powder # 7963 Fat Blend Used: Fat A/Fat B/Menhaden 10:70:20 W-3 Content of the flakes: 3.8%

| Formulation 5: Lemon | |
| --- | --- |
| | Wt % |
| Icing Sugar | 34.90 |
| Granular Sugar | 17.00 |
| Flour | 15.90 |
| Flavor(5) | 1.65 |
| Flavor(6) | 0.55 |
| Fat Blend | 30.00 |

(5)Givaudan Roure Natural Fresh lemon 201
(6)Lemon Peel Granules # 134616 Fat Blend Used: Fat A/Fat B/Menhaden 15:55:30 W-3 content of the flakes: 2.6%

| Formulation 6: Cinnamon Plus | |
|---|---|
| | Wt % |
| Icing Sugar | 34.95 |
| Granular Sugar | 22.05 |
| Cinnamon Ground(7) | 11.00 |
| Cinnamon Flavor(8) | 2.00 |
| Fat Blend | 30.00 |

(7)Cinnamon Ground McCormick 172366
(8)Givaudan Roure Spice N' Easy Cinnamon # 810289 Fat Blend Used:
Fat A/Fat B/Menhaden 15:55:30 W-3 content of the flakes: 2.6%

Fat A: Partially hydrogenated Soybean oil with capillary melting point 66–70° C. Fat B: Partially hydrogenated vegetable oil (cottonseed, soybean) with solid fat content at 20° C. 88–94 and at 35° C. max. 4.

Taste panel results:

The flakes according to formulations 1 to 6 above were stored for two weeks at 7° C. Thereafter they were divided in two portions. One was kept at 7° C., the other was stored at 20° C. table 1 shows the taste panel results for the flakes The fishy smell (Sm) and the taste (Ta) of the flakes were determined. None of the flakes had a fishy taste or smell, even not after 14 weeks at both storage temperatures.

Table 2 shows the taste panel results for the original fat blend containing 30% menhaden fish oil after 14 weeks storage at 20° C. This blend was stored under the same conditions as the flakes. The two non fish fats (i.e. fats A and B) which were applied in the blends were used as references. In the blend containing the fish oil a clear to strong fish taste and smell were detected by the panellists after 14 weeks storage. The references did not have a fish taste and smell.

Taste Panel scale (used in Tables 1 and 2): 0=no taste at all; 1=trace of taste; 2=faint taste; 3 clear taste; 4=strong taste; 5=very strong taste. Abbreviations: Week (wk), Smell (Sm), Taste (Ta)

TABLE 1

| Storage [wk] | 2 | | 4 | | | 6 | | | |
|---|---|---|---|---|---|---|---|---|---|
| Temp. [° C.] | 7 | | 7 | | 20 | | 7 | | 20 |
| Panel | Sm | Ta | Sm | Ta | Sm | Ta | Sm | Ta | Sm | Ta |
| Formulation 1 | 0 | 0 | 0 | 0 | 0 | 0 | 0 | 0 | 0 | 0 |
| Formulation 2 | 0 | 0 | 0 | 0 | 0 | 0 | 0 | 0 | 0 | 0 |
| Formulation 3 | 0 | 0 | 0 | 0 | 0 | 0 | 00 | 0 | 0 | 0 |
| Formulation 4 | 0 | 0 | 0 | 0 | 00 | 0 | 0 | 0 | 0 | 0 |
| Formulation 5 | 0 | 0 | 0 | 0 | 0 | 0 | 0 | 0 | 0 | 0 |
| Formulation 6 | 0 | 0 | 0 | 0 | 0 | 0 | 0 | 0 | 0 | 0 |

| Storage [wk] | 8 | | 14 | | | |
|---|---|---|---|---|---|---|
| Temp. [° C.] | 7 | | 7 | | 20 | |
| Panel | Sm | Ta | Sm | Ta | Sm | Ta |
| Formulation 1 | 0 | 0 | 0 | 0 | 0 | 0 |
| Formulation 2 | 0 | 0 | 0 | 0 | 0 | 0 |
| Formulation 3 | 0 | 0 | 0 | 0 | 0 | 0 |
| Formulation 4 | 0 | 0 | 0 | 0 | 00 | 0 |
| Formulation 5 | 0 | 0 | 0 | 0 | 0 | 0 |
| Formulation 6 | 0 | 0 | 0 | 0 | 0 | 0 |

TABLE 2

| Storage [wk] | 14 | |
|---|---|---|
| Storage [wk] | 20 | |
| Temp. [° C.] | Sm | Ta |
| Panel | 0 | 0 |
| Fat A | 0 | 0 |
| Fat B | 0 | 0 |
| Fat Blend containing menhaden oil | 4–5 | 4 |

What is claimed is:

1. Edible fat based, flavoured fat system suitable for use in baked goods and snacks comprising:
  i) 0 to 2 wt % of moisture;
  ii) 25 to 90 wt % of a bakery compatible fat composition, comprising:
    (1) a vegetable fat or a derivative therefrom having an N20 (unstabilised by NMR-pulse) of more than 50, and
    (2) 5–40 wt % of a fish oil composition, containing w-3 fatty acids in such quantities that the total w-3 content of total flavoured fat system ranges from 0.1 to 20 wt %,
  iii) 0 to 15 wt % of a flavouring system
  iv) 0 to 40 wt % of sugar
  v) 0 to 60 wt % of a filler material other than sugar
  vi) 0 to 50 wt % of a health component, and which edible fat based system has a particle size between 0.05 mm and 2.5 cm.

2. Edible fat based system according to claim 1 wherein the w-3 fatty acids are more than 80%, EPA and DHA, present in a ratio DHA/EPA of 0.5–6.0.

3. Edible fat based fat system according to claim 1 wherein the fat component has a trans fatty acid content of less than 5 wt %.

4. Edible fat based fat system according to claim 1, wherein the flavouring system is selected from the group consisting of the natural flavour components from lemons, oranges, strawberries, raspberries, blueberries, goose berries, redberries, blackberries, apples, pears, peaches, apricots, cherries, pumpkins, from nuts, like walnuts, hazelnuts, macadamia's, groundnuts, from herbs or spices like cinnamon, ginger, nutmeg, cloves, allspice, from maple sugar or dehydrated maple syrup, from garlic or onions, from butter or cheese, from savory flavors, from synthetic flavour components imitating above natural flavours, from ethnic flavours and from mixtures thereof.

5. Edible fat based fat system according to claim 4 wherein the flavour components are selected from the group consisting of: finely devided solid flavours; finely divided solid or liquid flavours on a solid carrier, liquid flavours and microcapsules containing a solid, or liquid, or gaseous flavour.

6. Edible fat based fat system according to claim 1 wherein the vegetable fat of the bakery compatible fat composition is selected from the group consisting of: natural or hardened glycerides based on C12+ fatty acids having a content of less than 5 wt % trans acids.

7. Edible fat based fat system according to claim 6 wherein the vegetable fat is cocoa butter, soybean oil, cottonseed oil, groundnut oil, rapeseed oil, sunflower oil, corn oil, palm oil, shea oil, illipe fat, palm kernel oil, coconut oil or fractions or blends thereof.

8. Edible fat based fat system according to claim 1 wherein the filler is a dried particulated ingredient selected from the group consisting of flour, skim milk powder, butter milk powder, starches, polysaccharides other than sugar, gums, whey powder, cellulose and hydrocolloids.

9. Edible fat based fat system according to claim 1 wherein the health component is selected from the group consisting of olives, grapes, grape fruit, paprika, garlic, tomatoes, oranges, lemons, berries, pumpkins, nuts, onions, herbs and spices.

10. Edible fat based fat system according to claim 9 wherein the health component comprises particulated fruit skins of olives, grapes, grape fruit, tomatoes, paprika or particulated garlic.

11. Bakery or snack products containing the edible fat based system according to claim 1.

12. Edible fat based, flavoured fat system according to claim 1 wherein the N20 of the vegetable fat or derivative therefrom is more than 65.

13. Edible fat based, flavoured fat system according to claim 1 wherein said fat composition comprises 15 to 35 wt % of said fish oil.

14. Edible fat based, flavoured fat system according to claim 13 wherein the total w-3 content of the flavoured fat system is 2 to 10 wt %.

* * * * *